United States Patent
Tsuchida et al.

(10) Patent No.: US 9,948,751 B2
(45) Date of Patent: Apr. 17, 2018

(54) COMPUTER SYSTEM, DATA OUTPUT METHOD, AND COMPUTER PROGRAM

(71) Applicant: CLARION CO., LTD., Saitama (JP)

(72) Inventors: Gen Tsuchida, Tokyo (JP); Daisuke Matsubara, Tokyo (JP); Hideki Takano, Tokyo (JP); Haruhiko Sawajiri, Saitama (JP); Yasushi Nagai, Saitama (JP); Kyosuke Tsurusu, Saitama (JP)

(73) Assignee: Clarion Co., Ltd., Saitama (JP)

( * ) Notice: Subject to any disclaimer, the term of this patent is extended or adjusted under 35 U.S.C. 154(b) by 624 days.

(21) Appl. No.: 14/294,191

(22) Filed: Jun. 3, 2014

(65) Prior Publication Data

US 2015/0046516 A1 Feb. 12, 2015

(30) Foreign Application Priority Data

Aug. 9, 2013 (JP) .................................. 2013-166649

(51) Int. Cl.
| | |
|---|---|
| *H04L 29/06* | (2006.01) |
| *G06F 11/34* | (2006.01) |
| *G06F 11/00* | (2006.01) |

(52) U.S. Cl.
CPC .............. *H04L 67/42* (2013.01); *G06F 11/00* (2013.01); *G06F 11/3476* (2013.01)

(58) Field of Classification Search
CPC ...................................................... H04L 67/42
USPC ........................................................ 709/203
See application file for complete search history.

(56) References Cited

U.S. PATENT DOCUMENTS

| | | | | |
|---|---|---|---|---|
| 4,430,702 A | * | 2/1984 | Schiebe | .................. G06F 12/14 709/220 |
| 8,447,804 B2 | * | 5/2013 | Bai | ........................ G07C 5/008 709/203 |
| 8,494,478 B1 | * | 7/2013 | Ponnangath | ........ G06F 11/1456 455/343.1 |

(Continued)

FOREIGN PATENT DOCUMENTS

JP 2011-227868 A 11/2011

OTHER PUBLICATIONS

European Search Report received in corresponding European Application No. 14172246 dated Jan. 7, 2015.

*Primary Examiner* — Vivek Srivastava
*Assistant Examiner* — Hien Doan
(74) *Attorney, Agent, or Firm* — Mattingly & Malur, PC

(57) ABSTRACT

A first apparatus inquires the second apparatus about whether a first data can be transmitted, in a case where the transmission is approved by the second apparatus, transmits the data to the second apparatus, and in a case where the transmission is not approved by the second apparatus, receives data from the second apparatus and outputs the data with its own data to a storage medium, and the second apparatus determines that a data is transmitted from the first apparatus on the basis of a condition pertaining to a second data communications channel, and upon having determined to approve the transmission from the first apparatus, receives the data from the first apparatus and transmits the data with its own data to a server via the second data communications channel, and upon having determined not to approve the transmission from the first apparatus, transmits its own data to the first apparatus.

13 Claims, 11 Drawing Sheets

(56) References Cited

U.S. PATENT DOCUMENTS

| | | | |
|---|---|---|---|
| 8,776,246 B2* | 7/2014 | Allegri | A61B 5/145 370/351 |
| 8,811,153 B1* | 8/2014 | Yang | H04L 49/1523 370/218 |
| 2001/0034796 A1* | 10/2001 | Zebian | H04L 12/2856 709/245 |
| 2008/0195750 A1* | 8/2008 | Sadovsky | G06F 21/78 709/234 |
| 2011/0246644 A1* | 10/2011 | Hamada | H04L 43/0811 709/224 |

* cited by examiner

Fig. 6

Log transmission method determination table (300)

| Priority (301) | Onboard log size (302) | Current month cumulative communication volume (303) | Remaining next-day communications volume (304) | Transmission log size (305) | Wireless LAN connection (306) | Carrier network connection (307) | Log transmission method (308) | |
|---|---|---|---|---|---|---|---|---|
| 1 | Equal to or larger than free capacity of mobile-side buffer | — | — | — | — | — | Via memory card | 310a |
| 2 | Less than free capacity of mobile-side buffer | | | | Valid | | Via wireless LAN | 310b |
| 3 | Less than free capacity of mobile-side buffer | | | | Invalid | Invalid | Via memory card | 310c |
| 4 | Less than free capacity of mobile-side buffer | Equal to or greater than warning threshold | | | Invalid | Valid | Via memory card | 310d |
| 5 | Less than free capacity of mobile-side buffer | Less than warning threshold | Equal to or greater than 50% of three-day limit | | Invalid | Valid | Via carrier network | 310e |
| 6 | Less than free capacity of mobile-side buffer | Less than warning threshold | Equal to or greater than 40% but less than 50% of three-day limit | Less than 10 Mbytes | Invalid | Valid | Via carrier network | 310f |
| 7 | Less than free capacity of mobile-side buffer | Less than warning threshold | Equal to or greater than 40% but less than 50% of three-day limit | Equal to or larger than 10 Mbytes | Invalid | Valid | Via memory card | 310g |
| 8 | Less than free capacity of mobile-side buffer | Less than warning threshold | Less than 40% of three-day limit | | Invalid | Valid | Via memory card | 310h |

COMPUTER SYSTEM, DATA OUTPUT METHOD, AND COMPUTER PROGRAM

CROSS-REFERENCE TO RELATED APPLICATIONS

The present application claims priority from Japanese Patent Application No. 2013-166649 filed on Aug. 9, 2013, the entire contents of which are hereby incorporated by reference.

BACKGROUND OF THE INVENTION

1. Field of the Invention

The present invention relates to technology for providing data stored in a computer to a prescribed server.

2. Description of the Related Art

In recent years, a telematics systems that connects a car navigation or other such onboard terminal to a data center using a communications channel of a smartphone or other such mobile communication terminal (hereinafter referred to as "mobile terminal") to provide various services pertaining to car navigation via the communications channel has become known.

In addition, when a problem of some sort occurs in either an onboard terminal or a mobile terminal, the data center collects log data stored in the either onboard terminal or mobile terminal, and analyzes the problem in the either onboard terminal or mobile terminal on the data center side (Japanese Patent Application Laid-open No. 2011-227868.

However, various restrictions may be placed on a mobile terminal communications channel. In accordance with this, the transmission of log data via the communications channel could prove disadvantageous for the user.

Accordingly, an object of the present invention is to appropriately determine, on the basis of restrictions and so forth pertaining to a communications channel, how data stored in a computer should be provided to a server.

SUMMARY OF THE INVENTION

A first apparatus and a second apparatus of a computer system pertaining to an example of the present invention are connected to a first data communications channel.

The first apparatus stores a first data in a first storage part, and inquires with the second apparatus via the first data communications channel about whether the first data can be transmitted. The first apparatus, in a case where the transmission is approved by the second apparatus, transmits the first data to the second apparatus via the first data communications channel, and in a case where the transmission is not approved by the second apparatus, receives a second data from the second apparatus via the first data communications channel, and outputs the first data and the second data to a storage medium.

The second apparatus stores the above-mentioned second data in a second storage part. The second apparatus, upon receiving an inquiry from the first apparatus via the first data communications channel about whether the first data can be transmitted, determines that the first data can be transmitted from the first apparatus on the basis of a condition pertaining to a second data communications channel that the second apparatus can use.

In this determination, upon having determined to approve transmission of the first data from the first apparatus, the second apparatus receives the first data from the first apparatus via the first data communications channel, and transmits the first data and the second data to a server via the second data communications channel.

In this determination, upon having determined not to approve transmission of the first data from the first apparatus, the second apparatus transmits the second data to the first apparatus via the first data communications channel.

According to the present invention, it is possible to appropriately determine how data stored in a computer should be provided to a server on the basis of restrictions and the like pertaining to a communications channel.

BRIEF DESCRIPTION OF THE DRAWINGS

FIG. 6 is a drawing showing an example of the configuration of a log transmission method determination table;

DESCRIPTION OF THE PREFERRED EMBODIMENT

Figure 1:
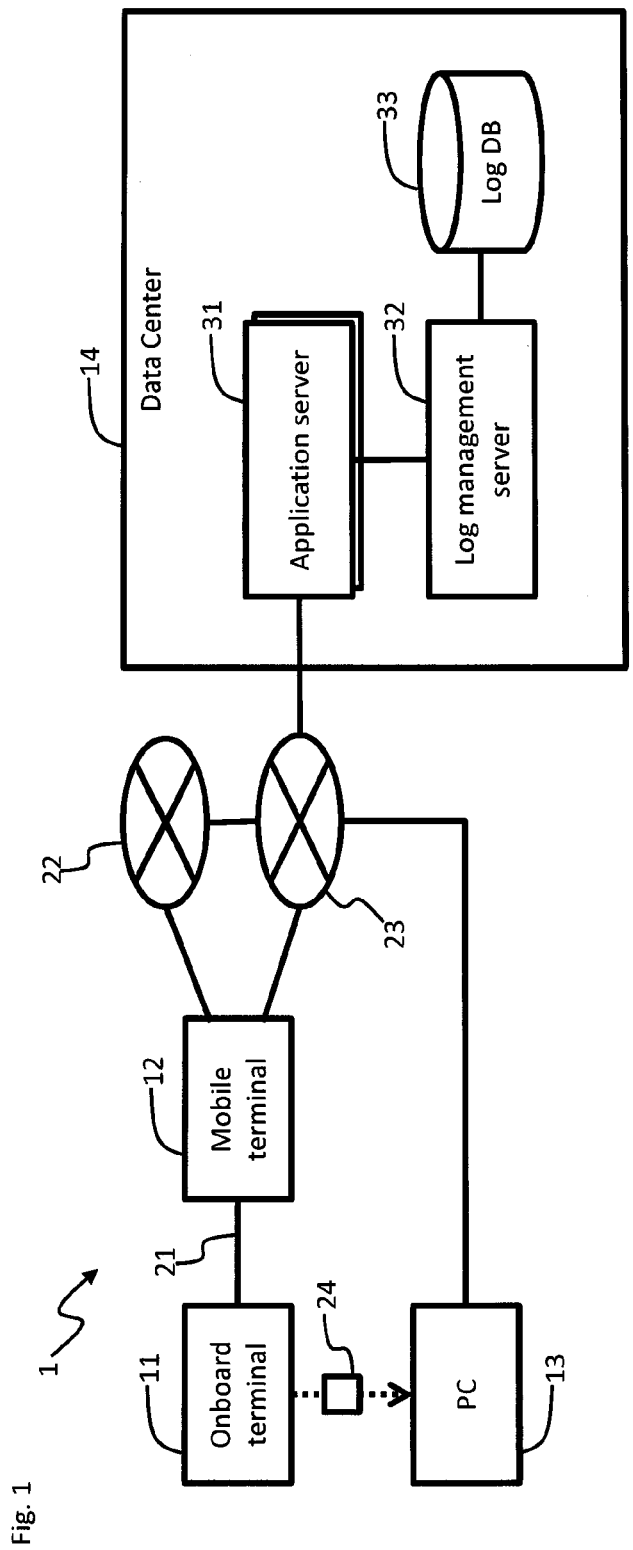
FIG. 1 is a block diagram showing an example of the overall configuration of a telematics system.

An example of a computer system in which an onboard terminal, which is a type of first apparatus, and a mobile communication terminal, which is a type of second apparatus, are connected by an inter-terminal communications channel, which is a type of first data communications channel, will be explained below while referring to the drawings.

FIG. 1 is a block diagram showing an example of the overall configuration of a computer system (hereinafter referred to as the "system") pertaining to a telematics service.

The system 1 includes an onboard terminal 11, a mobile terminal 12, a personal computer (PC) 13, and a data center 14.

The onboard terminal 11, for example, is a car navigation apparatus. The onboard terminal 11 not only executes a pre-installed application, but can also be installed with an application later on. The onboard terminal 11 comprises an interface (I/F) for a memory card 24, and has functions for reading/writing data from/to the memory card 24. The mobile terminal 12, for example, is a mobile telephone, a smartphone, or a mobile PC or the like.

The mobile terminal 12 transmits and receives data in a bidirectional manner to/from the data center 14 through either a carrier network 22 or an internet network 23.

The carrier network 22, for example, is managed by a telecommunications carrier. The mobile terminal 12, for example, is connected to the carrier network 22 on the basis of a standard such as 3G, IMT 2000 and/or long term evolution (LTE). Restrictions or a contract or the like related to data communications volume may exist for the carrier network 22. For example, there may be a restriction or a contract or the like for restricting the transmission speed in a case where one month's worth of accumulated communications volume exceeds a prescribed value. The carrier network 22 and the internet network 23 may be connected. The mobile terminal 12, for example, is connected to the internet network 23 via a wireless local area network (LAN). Restrictions related to data communications volume either do not exist for the internet network 23, or may be ignored in this example.

The PC 13, which is a type of electronic computer, comprises an I/F for the memory card 24, and has functions for reading/writing data from/to the memory card 24. The PC 13, for example, is connected to the internet network 23 by either an asymmetric digital subscriber line (ADSL) or fiber to the home (FTTH). The PC 13 transmits and receives data in a bidirectional manner to/from the data center 14 via the internet network 23.

The onboard terminal 11 and the mobile terminal 12 are connected by an inter-terminal communications channel 21, and can transmit and receive data in a bidirectional manner via the inter-terminal communications channel 21. The inter-terminal communications channel 21 may be wired or wireless. A wireless inter-terminal communications channel 21, for example, is configured using either Bluetooth (registered trademark) or a wireless LAN. A wired inter-terminal communications channel 21, for example, is configured using USB cable.

The data center 14, for example, comprises a group of servers, which are types of electronic computers for providing telematics services. The data center 14 can transmit and receive data to/from the onboard terminal 11, the mobile terminal 12, and the PC 13 via the internet network 23. The data center 14, for example, comprises an application server 31, a log management server 32, and a log database (DB) 33.

The application server 31 is for executing a process related to the telematics service. The log management server 32 collects log data (hereinafter referred to as the "log") pertaining to the onboard terminal 11 and the mobile terminal 12, and stores and manages the logs in the log DB 33. The flow by which the data center 14 collects the logs pertaining to the onboard terminal 11 and the mobile terminal 12 will be explained next.

Figure 2:
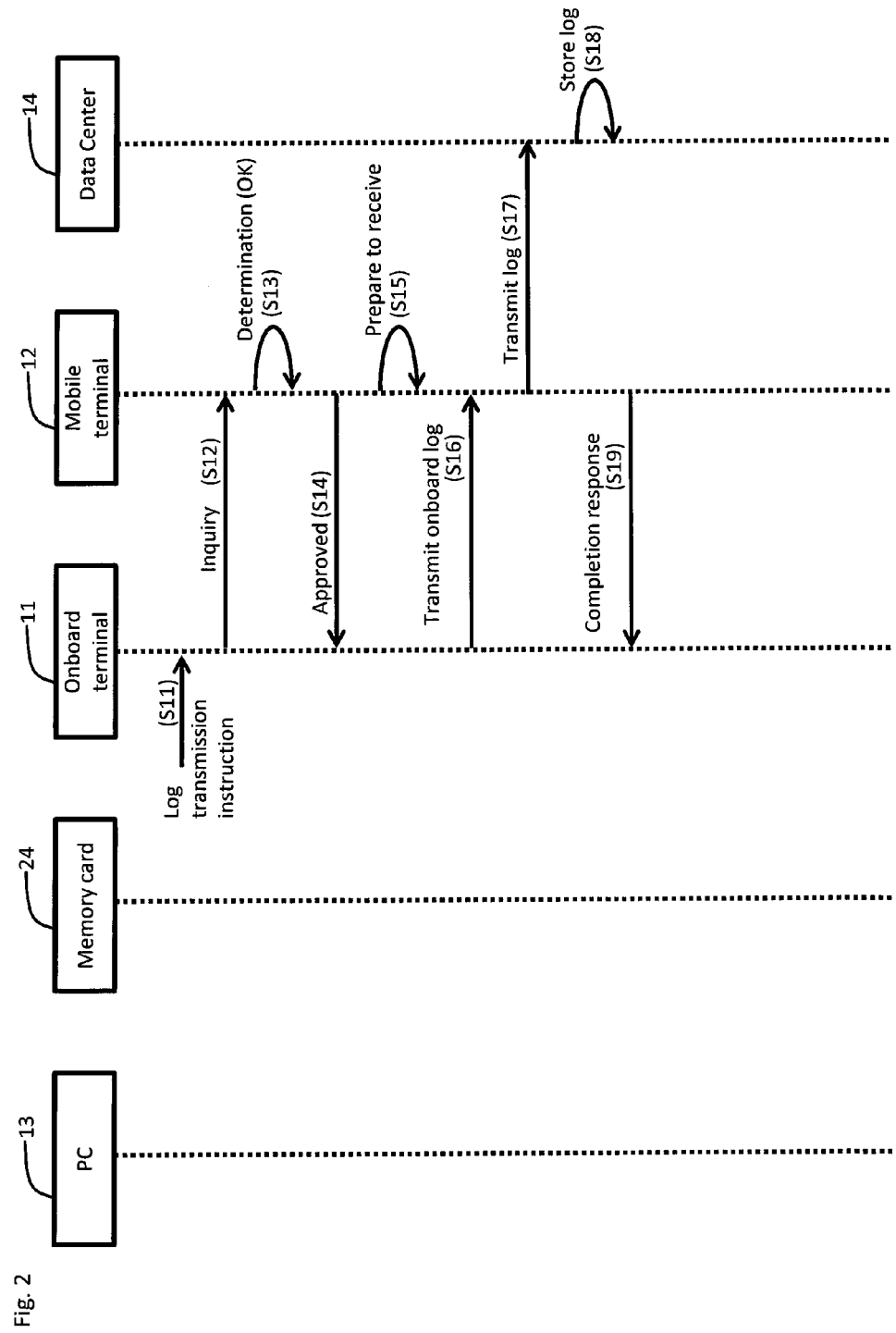
FIG. 2 is a sequence chart showing an example of processing for transmitting a log from a mobile terminal to a data center.

FIG. 2 is a sequence chart of a case in which a log is transmitted from the mobile terminal 12 to the data center 14.

When a log transmission instruction with respect to the onboard terminal 11 is received from a user (S11), the onboard terminal 11 inquires with the mobile terminal 12 about whether or not a log pertaining to the onboard terminal 11 (hereinafter referred to as the "onboard log") may be transmitted to the mobile terminal 12 (S12).

Upon receiving the inquiry, the mobile terminal 12 determines whether or not the onboard log and a log pertaining to the mobile terminal 12 (hereinafter referred to as the "mobile log") may be transmitted to the data center 14 using the carrier network 22 (S13). This determination method will be explained hereinbelow.

A case in which the mobile terminal 12 has determined that the onboard log and the mobile log may be transmitted to the data center 14 using the carrier network 22 (S13: OK) will be explained below.

The mobile terminal 12 returns a response to the onboard terminal 11 to the effect that the transmission of the onboard log is approved (S14). In addition, the mobile terminal 12 prepares to receive the onboard log (S15).

The onboard terminal 11 receives this response, and transmits the onboard log to the mobile terminal 12 via the inter-terminal communications channel 21 (S16).

Figure 5:
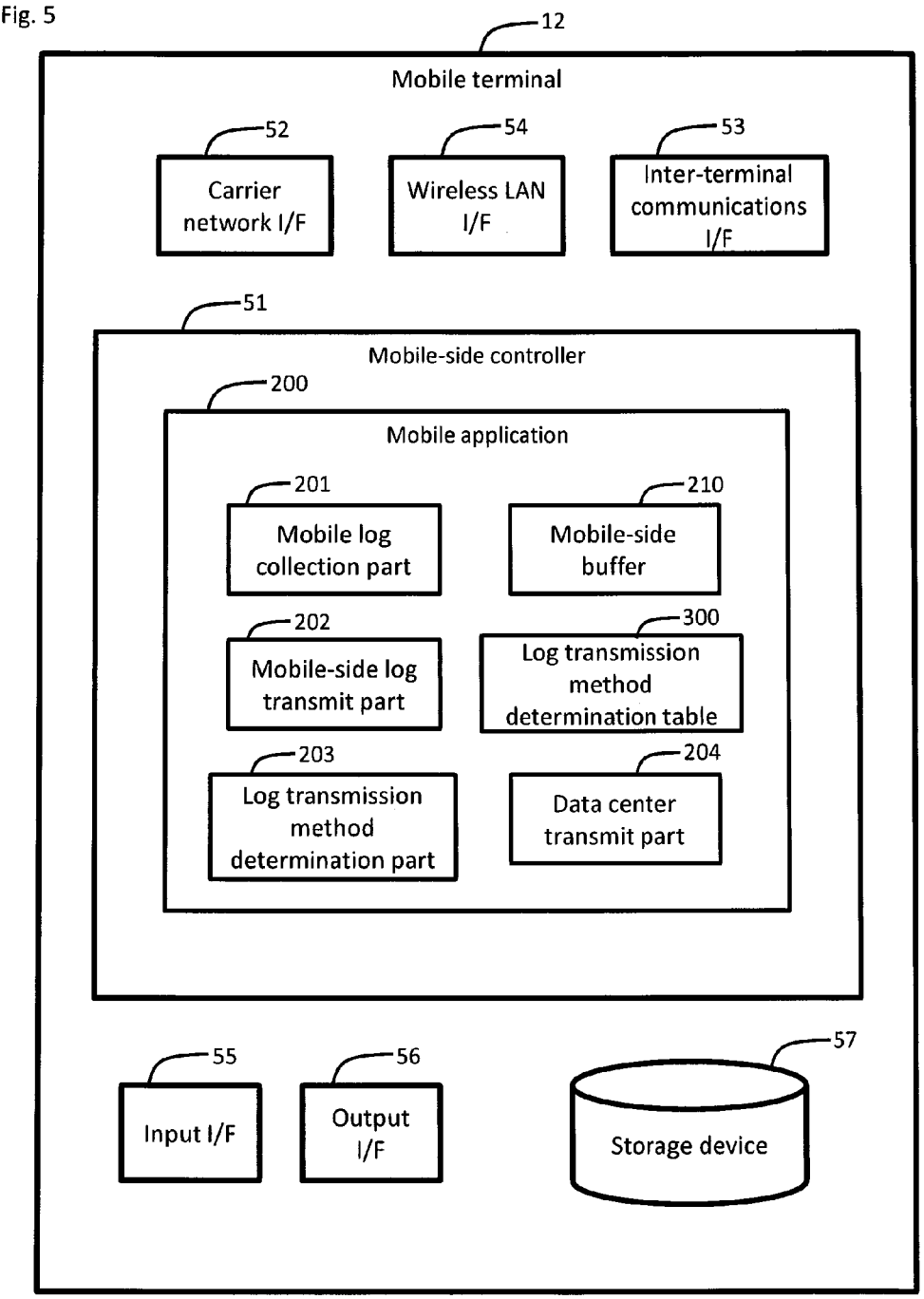
FIG. 5 is a block diagram showing an example of the configuration of a mobile terminal.

The mobile terminal 12 stores the onboard log received from the onboard terminal 11 in a mobile-side buffer 210 (refer to FIG. 5). Then, the mobile terminal 12 transmits the onboard log and the mobile log that are being stored in the mobile-side buffer to the data center 14 via the carrier network 22 (S17).

The data center 14 receives the onboard log and the mobile log transmitted from the mobile terminal 12, and stores the logs in the log DB 33 (S18).

The mobile terminal 12, after completing the transmission of the onboard log and the mobile log to the data center 14, returns a response to the onboard terminal 11 via the inter-terminal communications channel 21 to the effect that the transmission of the onboard log to the data center 14 has been completed (S19). The above-described processing makes it possible to transmit the onboard log and the mobile log to the data center 14.

Figure 3:
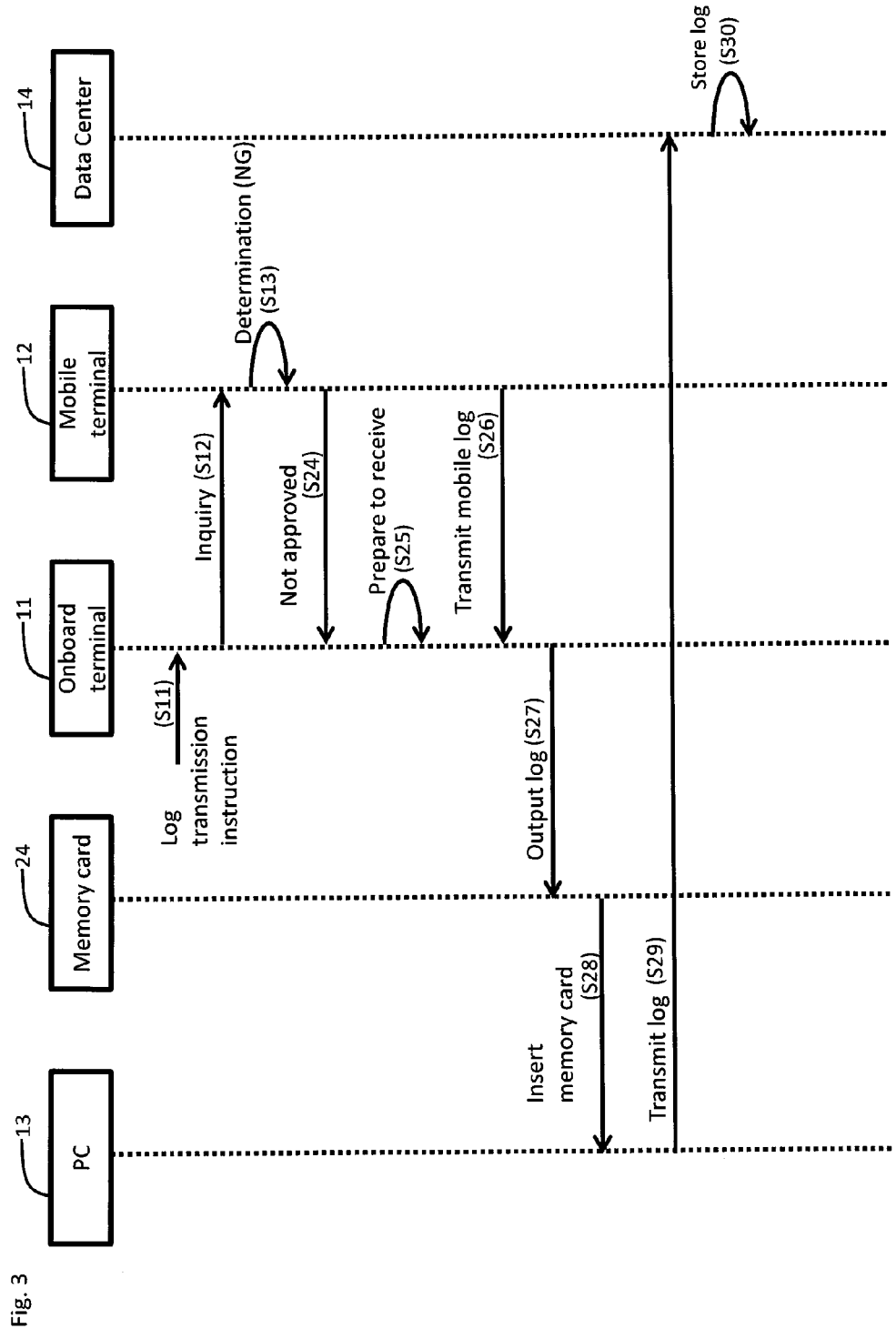
FIG. 3 is a sequence chart showing an example of processing for transmitting a log to the data center via a PC.

FIG. 3 is a sequence chart of a case in which a log is transmitted to the data center 14 via the PC 13.

The processing from Steps S11 through S13 is the same as in the case of FIG. 2, and as such will be omitted. However, in FIG. 3, the determination by the mobile terminal 12 is NG (S13). A case in which the mobile terminal 12 has determined that the onboard log and the mobile log may not be transmitted to the data center 14 using the carrier network 22 (S13: NG) will be explained below.

The mobile terminal 12 returns a response to the onboard terminal 11 to the effect that the transmission of the onboard log is not approved (S24). The onboard terminal 11 receives this response, and prepares to receive a mobile log (S25).

The mobile terminal 12 transmits the mobile log to the onboard terminal 11 via the inter-terminal communications channel 21 (S26).

Figure 4:
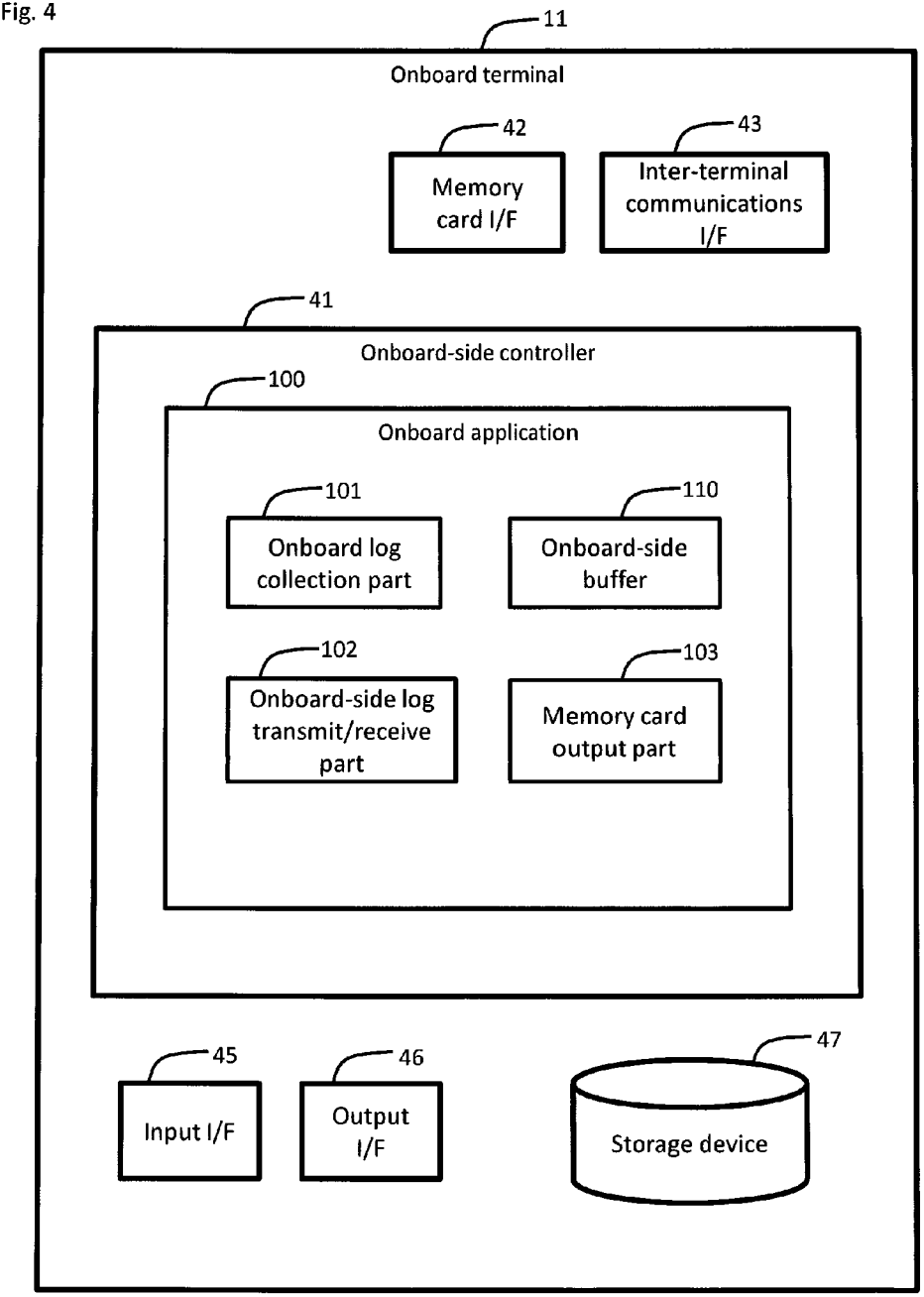
FIG. 4 is a block diagram showing an example of the configuration of an onboard terminal.

The onboard terminal 11 stores the mobile log received from the mobile terminal 12 in an onboard-side buffer 110 (Refer to FIG. 4). Then, the onboard terminal 11 outputs the onboard log and the mobile log that are being stored in the onboard-side buffer 110 to the memory card 24 (S27).

The user removes the memory card 24 on which the onboard log and the mobile log are being stored from the onboard terminal 11 and inserts the memory card 24 in the PC 13 (S28).

The PC 13 transmits the onboard log and the mobile log read from the memory card 24 to the data center 14 via the Internet network 23 (S29).

The data center 14 receives the onboard log and the mobile log transmitted from the PC 13, and stores the logs in the log DB 33 (S30). The above-described processing makes it possible to transmit the onboard log and the mobile log to the data center 14.

FIG. 4 is a block diagram showing an example of the configuration of the onboard terminal 11.

The onboard terminal 11 comprises an onboard-side controller 41, a storage device 47, an input I/F 45, an output I/F 46, a memory card I/F 42, and an inter-terminal communications I/F 43.

The storage device 47, for example, comprises a nonvolatile memory, and is capable of reading/writing data. The nonvolatile memory, for example, comprises either a flash memory or an HDD or the like. An onboard log may be stored in the storage device 47. The onboard log, for example, includes information for analyzing a malfunction or the like that has occurred in the onboard terminal 11 and an onboard application 100. A mobile log that has been transmitted from the mobile terminal 12 may also be stored in the storage device 47.

The input I/F 45 is for receiving an instruction from the user, and conveying this instruction to the onboard-side controller 41. The input I/F 45, for example, comprises a button, a touch panel, and/or a microphone.

The output I/F 46 is for conveying a processing result of the onboard-side controller 41 to the user. The output I/F 46, for example, comprises a display and/or a speaker.

The memory card I/F 42 is for inserting the memory card 24 (for example, an SD memory card) into the onboard terminal 11. The onboard-side controller 41 can read/write data from/to the memory card 24 inserted in the memory card I/F 42.

The inter-terminal communications I/F 43 is for connected the onboard terminal 11 to the mobile terminal 12 and so forth. The inter-terminal communications I/F 43 is used for realizing the inter-terminal communications channel 21 described hereinabove. The inter-terminal communications I/F 43 in a case where the terminals are connected by wire, for example, is a USB adapter. The inter-terminal communications I/F 43 in a case where the terminals are connected wirelessly, for example, is a Bluetooth (IEEE 802.15) communications adapter.

The onboard-side controller 41 processes a computer program, and controls an operation pertaining to the onboard terminal 11. The onboard-side controller 41, for example, processes the onboard application 100, which is a type of computer program. The onboard application 100 may be pre-installed in the onboard terminal 11, or may be installed by the user later on.

The onboard application 100, for example, comprises an onboard log collection part 101, an onboard-side log transmit/receive part 102, a memory card output part 103, and an onboard-side buffer 110. The onboard-side buffer 110 may be reserved in a storage area of the storage device 47, or may be reserved in a prescribed memory (not shown in the drawing).

The onboard log collection part 101 collects various information pertaining to the operation of the onboard terminal 11 and the onboard application 100, and stores this information in the onboard-side buffer 110 as an onboard log.

The onboard-side log transmit/receive part 102 receives a mobile log via the inter-terminal communications I/F 43, and stores this log in the onboard-side buffer 110. The onboard-side log transmit/receive part 102 also transmits the onboard log that is being stored in the onboard-side buffer 110 to the mobile terminal 12 via the inter-terminal communications I/F 43.

The memory card output part 103 writes the onboard log and the mobile log being stored in the onboard-side buffer 110 to the memory card 24 via the memory card I/F 42.

FIG. 5 is a block diagram showing an example of the configuration of the mobile terminal 12.

The mobile terminal 12 comprises a mobile-side controller 51, a storage device 57, an input I/F 55, an output I/F 56, a carrier network I/F 52, an inter-terminal communications I/F 53, and a wireless LAN I/F 54.

The storage device 57, for example, comprises a nonvolatile memory, and is capable of reading and writing data. The nonvolatile memory, for example, comprises a flash memory or the like. A mobile log may be stored in the storage device 57. The mobile log includes information for analyzing a malfunction or the like that has occurred in the mobile terminal 12 and a mobile application 200. An onboard log that has been transmitted from the onboard terminal 11 may also be stored in the storage device 57.

The input I/F 55 is for receiving an instruction from the user, and conveying this instruction to the mobile-side controller 51. The input I/F 55, for example, comprises a button, a touch panel, and/or a microphone.

The output I/F 56 is for conveying a processing result of the mobile-side controller 51 to the user. The output I/F 56, for example, comprises a display and/or a speaker.

The inter-terminal communications I/F 53 is for connecting the mobile terminal 12 to another apparatus, such as the onboard terminal 11. The inter-terminal communications I/F 53 is the same as the inter-terminal communications I/F 43 that was explained with respect to the onboard terminal 11.

The wireless LAN I/F 54 is for connecting the mobile terminal 12 to the wireless LAN. The wireless LAN I/F 54, for example, is a wireless communications adapter that conforms to IEEE 802.11.

The carrier network I/F 52 is for connecting the mobile terminal 12 to the carrier network 22. The carrier network I/F 52, for example, is a wireless communications adapter conforming to the 3G, IMT 2000 and/or LTE standard.

The mobile-side controller 51 processes a computer program, and controls an operation pertaining to the mobile terminal 12. The mobile-side controller 51, for example, processes the mobile application 200, which is a type of computer program. The mobile application 200 may be pre-installed in the mobile terminal 12, or may be installed by the user later on. The mobile application 200, for example, is provided by the telematics service provider.

The mobile application 200 comprises a mobile log collection part 201, a mobile-side log transmit/receive part 202, a log transmission method determination part 203, a mobile-side buffer 210, a data center transmit part 204, and a log transmission method determination table 300. The mobile-side buffer 210 may be reserved in a storage area of the storage device 57, or may be reserved in a prescribed memory (not shown in the drawing).

The mobile log collection part 201 collects various information pertaining to the operation of the mobile terminal 12 and the mobile application 200, and stores this information in the mobile-side buffer 210 as a mobile log.

The mobile-side log transmit/receive part 202 receives an onboard log via the inter-terminal communications I/F 53, and stores this log in the mobile-side buffer 210. The mobile-side log transmit/receive part 202 also transmits the mobile log that is being stored in the mobile-side buffer 210 to the onboard terminal 11 via the inter-terminal communications I/F 53.

The data center transmit part 204 transmits the onboard log and the mobile log that are being stored in the mobile-side buffer 210 to the data center 14 using the carrier network I/F 52.

The log transmission method determination part 203 determines the method that may be used to transmit the onboard log and the mobile log. The log transmission method determination part 203 may determine whether or not the onboard log and the mobile log are to be transmitted using either the carrier network 22 or the wireless LAN.

For example, the log transmission method determination part 203, upon receiving an inquiry from the onboard terminal 11 as to whether or not an onboard log may be transmitted (Refer to S12 of FIG. 2, and S22 of FIG. 3), determines whether or not to transmit the logs to the data center 14 using either the carrier network 22 or the wireless LAN on the basis of a prescribed condition.

When it has been determined here that the logs will be transmitted to the data center 14 using either the carrier network 22 or the wireless LAN (S13 of FIG. 2: OK), the log transmission method determination part 203 may return a response to the onboard terminal 11 to the effect that the transmission of the onboard log is approved (refer to S14 of FIG. 2).

When it has been determined here that the logs will not be transmitted to the data center 14 using either the carrier network 22 or the wireless LAN (S13 of FIG. 3: NG), the log transmission method determination part 203 may return a response to the onboard terminal 11 to the effect that the transmission of the onboard log is not approved (refer to S24 of FIG. 3).

Figure 11:
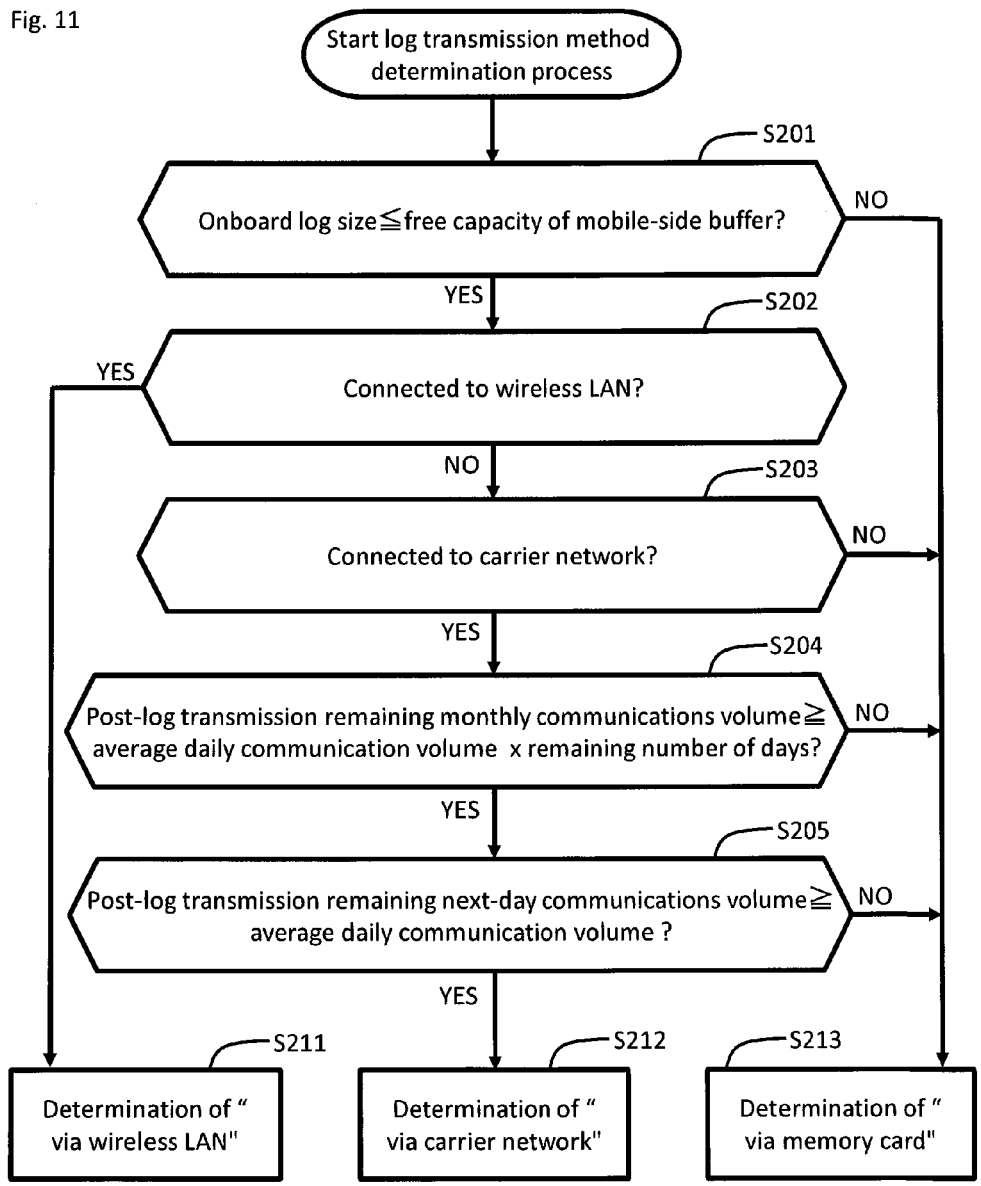
FIG. 11 is a flowchart showing a variation of processing for determining a log transmission method.

The log transmission method determination part 203 may use the log transmission method determination table 300 to perform this determination (Refer to FIG. 6), or may perform this determination on the basis of another condition (Refer to FIG. 11). Next, after explaining an example of the configuration of the log transmission method determination table 300, an example of the determination method in the log transmission method determination part 203 will be described.

FIG. 6 shows an example of the configuration of the log transmission method determination table 300.

The log transmission method determination table 300 comprises conditions for the log transmission method determination part 203 to determine a method for transmitting a log. The log transmission method determination table 300 comprises as fields a priority 301, an onboard log size 302, a current month cumulative communications volume 303, a remaining next-day communications volume 304, a transmission log size 305, a wireless LAN connection 306, a carrier network connection 307, and a log transmission method 308.

A priority for each entry in the log transmission method determination table 300 is stored in the priority 301. That is, the possibility of a match is determined in order from the entry having the highest priority.

A condition pertaining to the relationship between the size on the onboard log and the free capacity of the mobile-side buffer 210 is stored in the onboard log size 302. For example, entry 310a indicates that when the onboard log size is equal to or larger than the free capacity of the mobile-side buffer 210, the log transmission method is determined to be "via memory card". This is because the mobile terminal 12 would not be able to store the onboard log in the mobile-side buffer 210 when the onboard log was received.

A condition pertaining to the state of the mobile terminal 12 connection to the wireless LAN is stored in the wireless LAN connection 306. For example, entry 310b indicates that when the wireless LAN connection for the mobile terminal 12 is "valid", the log transmission method is determined to be "via wireless LAN". This is because in most cases restrictions on communication volume are not generally applied to wireless LAN communications. When the mobile terminal 12 does not comprise a function for connecting to the wireless LAN, there is no need to use the wireless LAN connection condition in the determination.

A condition pertaining to the mobile terminal 12 connection to the carrier network 22 is stored in the carrier network connection 307. Normally, the carrier network connection is in the "valid" state when the mobile terminal 12 is within a communication area pertaining to the carrier network 22, and the network connection is in the "invalid" state when the mobile terminal 12 is outside the communication area. When the user, on his own accord, sets the connection to the carrier network 22 to "OFF", the carrier network connection of the mobile terminal 12 normally transitions to the "invalid" state.

A condition pertaining to the size (data amount) of the log to be transmitted is stored in the transmission log size 305. The transmission log size 305 may be the total of the onboard log size and the mobile log size.

A condition pertaining to a cumulative volume of communications for the current month is stored in the current month cumulative communications volume 303. The current month cumulative communications volume, for example, may be calculated as the accumulation of the volume of communications from the start of a one-month period until the current time point. This time period is not limited to one month, and for example may a prescribed period of three months, two weeks, and so forth.

A warning threshold is a value based on the upper limit of the volume of communications capable of being used during a one-month period (hereinafter referred to as the "monthly communications volume limit"). The warning threshold, for example, may be configured at 70% of the monthly communications volume limit. The warning threshold may be configured so as to become smaller the longer the time period is from the current time point to the last day of the current month (end of time period). This, for example, is because when most of the communications volume is used to transmit logs at the beginning of the month, the communications volume capable of being used by a mobile terminal during the remaining days of the month will decrease, adversely affecting the daily use of the mobile terminal by the user. Accordingly, lowering the warning threshold at the beginning of the month increases the communications volume capable of being used by the mobile terminal during the remaining days of the month.

The aforementioned determination may be performed by comparing the current month cumulative communications volume and warning threshold prior to transmitting the onboard log and the mobile log. Or, the aforementioned determination may be performed by comparing the current month cumulative communications volume and warning threshold subsequent to hypothesizing that the onboard log and the mobile log have been transmitted. The current month cumulative communications volume subsequent to hypothesizing that the onboard log and the mobile log have been transmitted may be calculated on the basis of the total of the data size of the onboard log and the data size of the mobile log.

The monthly communications volume limit may be configured on the basis of a contract between the user of the mobile terminal 12 and the telecommunications carrier. In a case where the mobile terminal 12 user has concluded a contract with the telecommunications carrier for unlimited monthly communications volume, there is no need to use the current month cumulative communications volume 303 in the determination.

For example, entry 310d indicates that the log transmission method is determined to be "via memory card" when the current month cumulative communications volume is equal to or greater than the warning threshold.

A condition pertaining to the cumulative communications volume for the most recent three-day period (for example, the period from two days prior until the current day), for example, is stored in the remaining next-day communications volume 304. That is, this time period fluctuates as a result of using the current time point as the end of the period. This time period is not limited to three days, and for example may be either two days, or seven days, and so forth. The remaining next-day communications volume 304 will be explained next while using the drawings, based on the assumption that an upper limit has been set for the volume of communications capable of being used during the most recent three-day period (hereinafter referred to as the "three-day communications volume limit").

Figure 7:
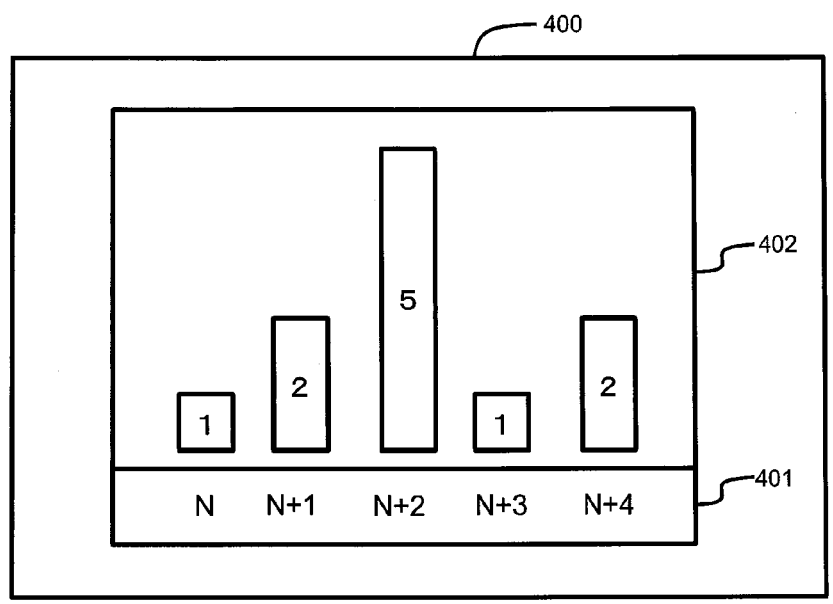
FIG. 7 is a drawing for illustrating a remaining next-day communications volume.

FIG. 7 is a drawing for illustrating the remaining next-day communications volume 304.

In the graph 400 of FIG. 7, the horizontal axis represents the date 401, and the vertical axis represents the volume of communications used by the user in a day (hereinafter referred to as the "daily communications volume") 402. It is assumed here that the three-day communications volume limit is "10".

For example, when the current day is day (N+3), the three-day cumulative communications volume is the total of "2", "5", and "1", which are the daily communications volumes for day (N+1), day (N+2), and day (N+3), or "8". On the next day (N+4), the daily communications volume "2" of day (N+1) is reset, thereby making the three-day cumulative communications volume "6". That is, the remaining next-day communications volume for day (N+4) is the difference between the three-day communications volume limit of "10" and "6", or "4".

Similarly, when the current day is day (N+4), the three-day cumulative communications volume for the next day, day (N+5), becomes "3", and as such, the remaining next-day communications volume for the next day, day (N+5), becomes "7".

Returning to the explanation of FIG. 6, for example, when the remaining next-day communications volume is "4", dividing "4" by the three-day communications volume limit of "10" results in "4/10=40%". This corresponds to "equal to or greater than 40% but less than 50% of three-day limit", which is the condition for the remaining next-day communications volume 304 in entries 310f and 310g.

Similarly, for example, when the remaining next-day communications volume is "7", dividing "7" by the three-day communications volume limit results in 70%. This corresponds to "equal to or greater than 50% of three-day limit", which is the condition of the remaining next-day communications volume 304 in entry 310e.

The aforementioned determination may be performed by comparing the most recent two-day cumulative communications volume to a threshold set on the basis of the three-day communications volume limit. The most recent two-day cumulative communications volume may be the cumulative communications volume of the most recent two days prior to transmitting the onboard log and the mobile log, or may be the cumulative communications volume of the most recent two days subsequent to the day of the hypothesized transmission of the onboard log and the mobile log. The cumulative communications volume of the most recent two days subsequent to the day of the hypothesized transmission of the onboard log and the mobile log may be calculated on the basis of the total of the onboard log data size and the mobile log data size.

A log transmission method is stored in the log transmission method 308. For example, any of "via memory card", "via wireless LAN", or "via carrier network" are stored in the log transmission method 308 of each entry.

The "via memory card" signifies a method in which the onboard log and the mobile log are collected on the onboard terminal 11 side, and the logs are outputted to a memory card 24 inserted into the onboard terminal 11. The logs outputted to the memory card 24, for example, are transmitted to the data center 14 using the PC 13, which is connected to the internet network 23.

The "via wireless LAN" signifies a method in which the onboard log and the mobile log are collected on the mobile terminal 12 side, and the logs are transmitted to the data center 14 using the wireless LAN.

The "via carrier network" signifies a method in which the onboard log and the mobile log are collected on the mobile terminal 12 side, and the logs are transmitted to the data center 14 using the carrier network 22.

The log transmission method determination part 203, for example, makes determinations as to whether or not there is a relevant entry in order from the entry having the highest priority 301 in the log transmission method determination table 300, and treats the method stored in the log transmission method 308 of the relevant entry as the determination result.

For example, when the onboard log size 302 is equal to or larger than the free capacity of the mobile-side buffer 210, the condition corresponds to entry 310a of the priority 301 "1", and as such, the log transmission method determination part 203 determines that the logs will be transmitted "via memory card". In this case, the onboard log and the mobile log are collected in the onboard-side buffer 110 of the onboard terminal 11, and outputted to the memory card 24.

For example, when the mobile terminal 12 is connected to the wireless LAN, the condition corresponds to entry 310b of the priority 301 "2", and as such, the log transmission method determination part 203 determines that the logs will be transmitted "via wireless LAN". In this case, the onboard log and the mobile log are collected in the mobile-side buffer 210 of the mobile terminal 12, and transmitted to the data center 14 using the wireless LAN.

For example, when the remaining next-day communications volume is equal to or greater than 40% but less than 50% of the three-day communications volume limit, the transmission log size is less than 10 Mbytes, and, in addition, the mobile terminal 12 is connected to the carrier network 22, the conditions correspond to entry 310f of the priority 301 "6", and as such, the log transmission method determination part 203 determines that the logs will be transmitted "via carrier network". In this case, the onboard log and the mobile log are collected in the mobile-side buffer 210 of the mobile terminal 12, and transmitted to the data center 14 using the carrier network 22.

The log transmission method determination table 300 may comprise various fields pertaining to restriction conditions for the carrier network 22 besides the aforementioned current month cumulative communications volume 303 and remaining next-day communications volume 304. For example, the log transmission method determination table 300 may comprise a field related to transmission speed, communication charges, or communication method.

Figure 8:
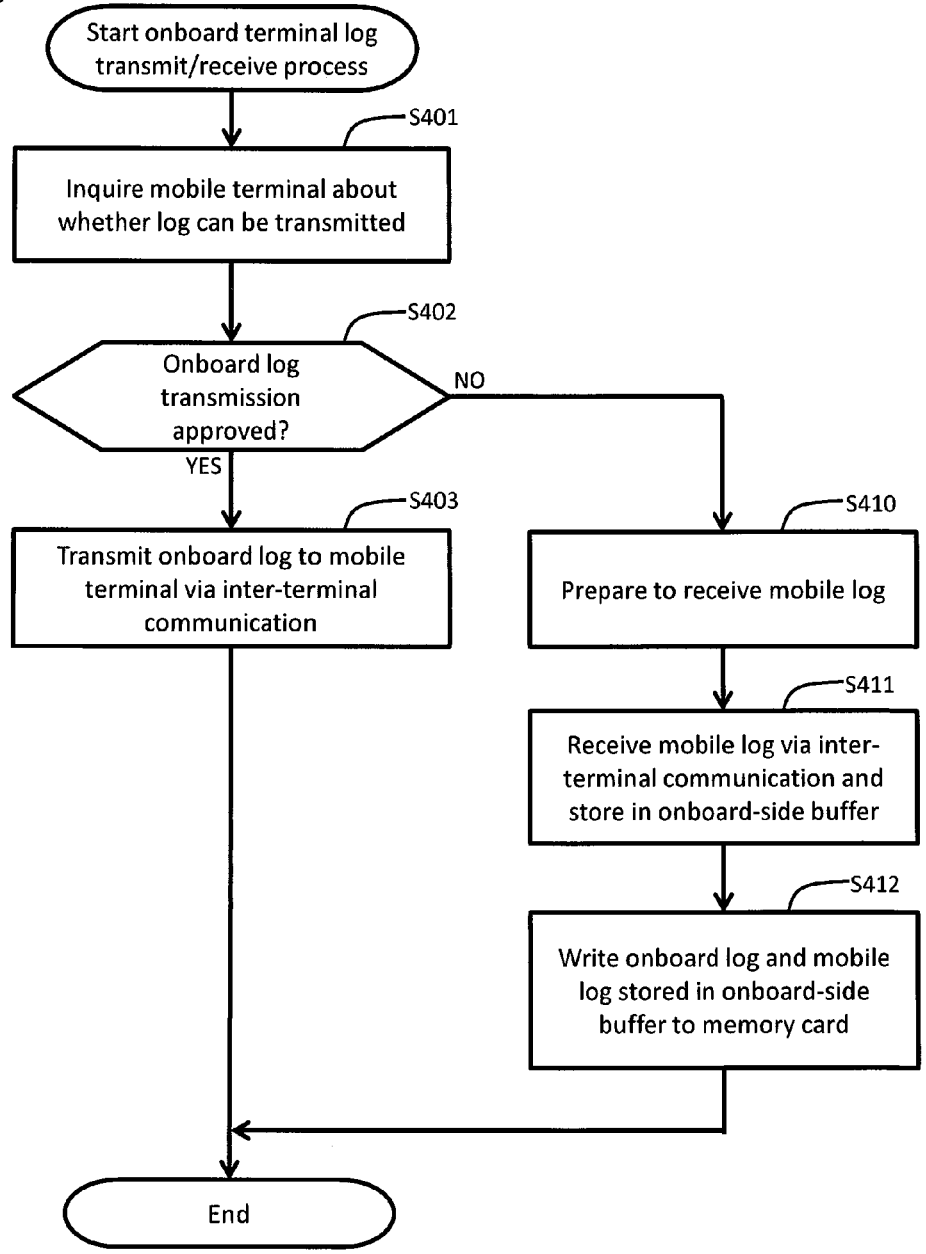
FIG. 8 is a flowchart showing an example of a log transmit/receive process in the onboard terminal.

FIG. 8 is a flowchart showing an example of log transmit/receive processing in the onboard terminal 11.

The onboard-side log transmit/receive part 102 inquires with the mobile terminal 12 about whether an onboard log can be transmitted (S401). At this time, the onboard-side log transmit/receive part 102 also notifies the mobile terminal 12 of the size of the onboard log.

Then, the onboard-side log transmit/receive part 102 receives from the mobile terminal 12 a response to the inquiry about whether the onboard log can be transmitted (S402).

When the onboard log transmission is approved (S402: YES), the onboard-side log transmit/receive part 102 transmits the onboard log being stored in the onboard-side buffer 110 to the mobile terminal 12 via the inter-terminal communications channel 21 (S403), and ends the processing (End).

When the onboard log transmission is not approved (S402: NO), the onboard-side log transmit/receive part 102 prepares to receive a mobile log (S410). Then, the onboard-side log transmit/receive part 102 receives the mobile log transmitted from the mobile terminal 12 via the inter-terminal communications channel 21, and stores the mobile log in the onboard-side buffer 110 (S411).

Then, the memory card output part 103 writes the onboard log and the mobile log being stored in the onboard-side buffer 110 to the memory card 24 (S412), and ends the processing (End).

Thereafter, the PC 13 into which the memory card 24 has been inserted transmits the onboard log and the mobile log stored in the memory card 24 to the data center 14 via the internet network 23. This above processing makes it possible to transmit the onboard log and the mobile log to the data center 14.

Figure 9:
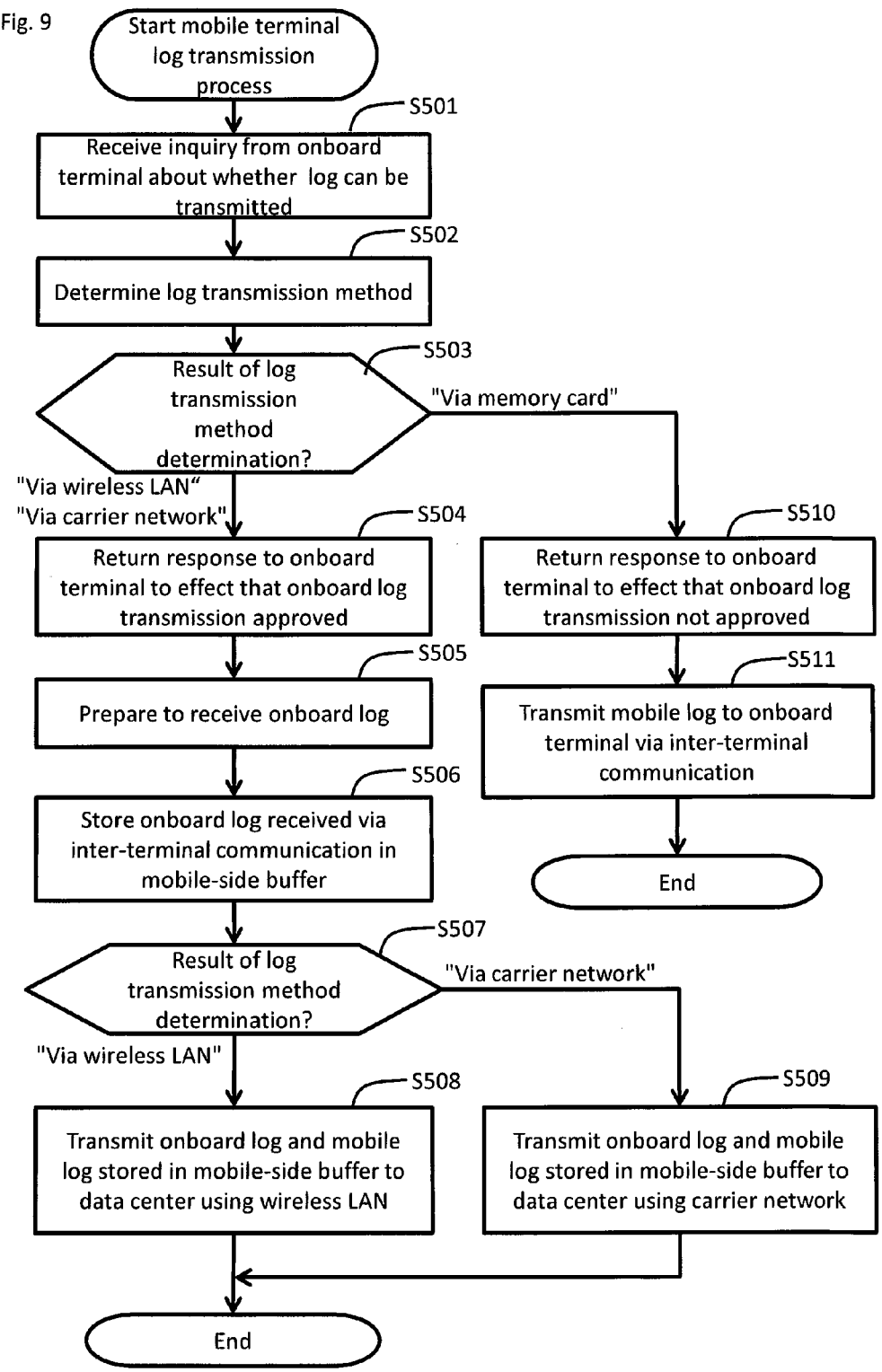
FIG. 9 is a flowchart showing an example of a log transmit/receive process in the mobile terminal.

FIG. 9 is a flowchart showing an example of log transmit/receive processing in the mobile terminal 12.

The mobile-side log transmit/receive part 202 receives an inquiry from the onboard terminal 11 about whether an onboard log can be transmitted (S501). At this time, the mobile-side log transmit/receive part 202 may also receive a notification from the onboard terminal 11 as to the size of the onboard log.

The log transmission method determination part 203 determines the log transmission method (S502). The size of the onboard log received earlier may be used in the log transmission method determination part 203.

When the result of the log transmission method determination is either "via wireless LAN" or "via carrier network" (S503: "via wireless LAN", "via carrier network"), the mobile-side log transmit/receive part 202 returns a response to the onboard terminal 11 to the effect that the transmission of the onboard log is approved (S504), and prepares to receive the onboard log (S505).

Then, the mobile-side log transmit/receive part 202 receives the onboard log from the onboard terminal 11 via the inter-terminal communications channel 21, and stores the onboard log in the mobile-side buffer 210 (S506).

Next, the data center transmission part 204 identifies whether the result of the log transmission method determination is either of "via wireless LAN" or "via carrier network" (S507).

When the result of the log transmission method determination is "via wireless LAN" (S507: "via wireless LAN"), the data center transmission part 204 uses the wireless LAN to transmit the onboard log and the mobile log being stored in the mobile-side buffer 210 to the data center 14 (S508), and ends the processing (End).

When the result of the log transmission method determination is "via carrier network" (S507: "via carrier network"), the data center transmission part 204 uses the carrier network 22 to transmit the onboard log and the mobile log being stored in the mobile-side buffer 210 to the data center 14 (S509), and ends the processing (End).

Alternatively, when the result of the log transmission method determination in S503 is "via memory card" (S503: "via memory card"), the mobile-side log transmit/receive part 202 returns a response to the onboard terminal 11 to the effect that the transmission of the onboard log is not approved (S510).

Then, the mobile-side log transmit/receive part 202 transmits the mobile log to the onboard terminal 11 via the inter-terminal communications channel 21 (S511), and ends the processing (End).

The above processing makes it possible to transmit the onboard log and the mobile log to the data center 14.

Figure 10:
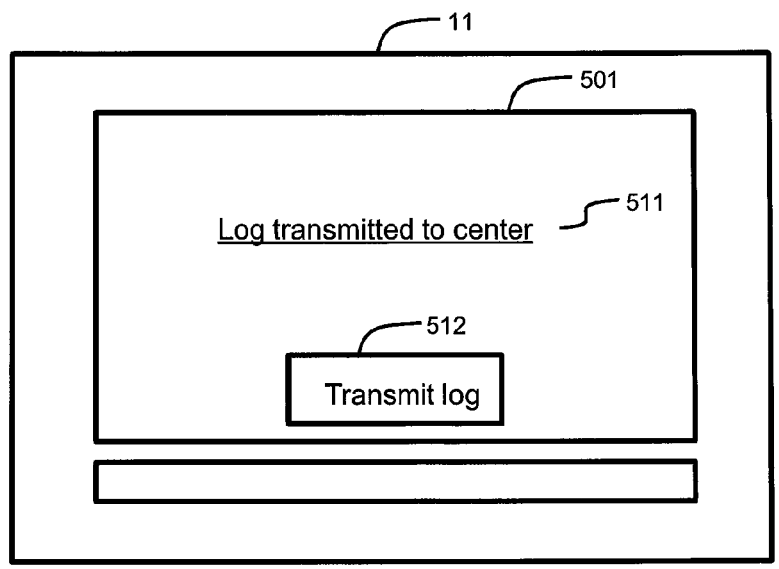
FIG. 10 is a schematic diagram showing an example of information displayed on a screen of the onboard terminal.

FIG. 10 is a schematic drawing showing an example of information displayed on a screen of the onboard terminal 11.

For example, a transmit log button 512 is displayed on a screen 501 displayed on the onboard terminal 11 via the output I/F 46. Then, when the transmit log button 512 is pressed, the processing of Step S401 of FIG. 8 may be executed. Also, when the onboard log has been transmitted using the carrier network 22, "log transmitted to data center" may be displayed on the screen 501 (refer to reference sign 511), and when the onboard log has been written to the memory card 24, "log saved to memory card" may be displayed on the screen 501 (not shown in drawing).

FIG. 11 is a flowchart showing a variation of the processing for determining the log transmission method.

This flowchart is an example of processing in a case where the log transmission method determination part 203 determines the log transmission method on the basis of conditions that differ in part from the table 300 shown in FIG. 6.

The log transmission method determination part 203 determines whether or not "onboard log size≤free capacity of mobile-side buffer 210" (S201).

When the "onboard log size>free capacity of mobile-side buffer 210" (S201: NO), the log transmission method determination part 203 determines that the log transmission method will be "via memory card".

When the "onboard log size≤free capacity of mobile-side buffer" (S201: YES), the log transmission method determination part 203 next determines whether or not the mobile terminal 12 is connected to the wireless LAN (S202).

When the mobile terminal 12 is connected to the wireless LAN (S202: YES), the log transmission method determination part 203 determines that the log transmission method will be "via wireless LAN".

When the mobile terminal 12 is not connected to the wireless LAN (S202: NO), the log transmission method determination part 203 next determines whether or not the mobile terminal 12 is connected to the carrier network 22 (S203).

When the mobile terminal 12 is not connected to the carrier network 22 (S203: NO), the log transmission method determination part 203 determines that the log transmission method will be "via memory card".

When the mobile terminal 12 is connected to the carrier network 22 (S203: YES), the log transmission method determination part 203 next determines whether or not "post-log transmission remaining monthly communications volume≥average daily communications volume×remaining number of days" (S204). The condition here may be "post-log transmission remaining monthly communications volume=monthly communications volume limit−pre-log transmission current month cumulative communications volume−transmission quantity based on transmission log size". The condition may also be "average daily communications volume=monthly communications volume limit/number of days in current month". Also, the average daily communications volume may be the heretofore average communications volume per day of either the user or the mobile terminal 12.

When the condition is "post-log transmission remaining monthly communications volume<average daily communications volume×remaining number of days" (S204: NO), the log transmission method determination part 203 determines that the log transmission method will be "via memory card". The reason for determining "via memory card" is because using the carrier network 22 to transmit the log here would significantly impact the use of the carrier network 22 by the mobile terminal 12 for the remainder of the month.

When the condition is "post-log transmission remaining monthly communications volume≥average daily communications volume×remaining number of days" (S204: YES), the log transmission method determination part 203 next determines whether or not "post-log transmission remaining next-day communications volume≥average daily communications volume" (S205).

When the condition is "post-log transmission remaining next-day communications volume<average daily communications volume" (S205: NO), the log transmission method determination part 203 determines that the log transmission method will be "via memory card". The condition here may also be "post-log transmission remaining next-day communications volume=three-day communications volume limit−most recent two-day communications volume−transmission log size". The reason for determining "via memory card" is because using the carrier network 22 to transmit the log here would significantly impact the use of the carrier network 22 by the mobile terminal 12 the next day.

When the condition is "post-log transmission remaining next-day communications volume≥average daily communications volume" (S205: YES), the log transmission method determination part 203 determines that the log transmission method will be "via carrier network". The reason for determining "via carrier network" is because using the carrier network 22 to transmit the log here will lessen the impact on the use of the carrier network 22 by the mobile terminal 12 the next day and for the remainder of the month.

The above processing makes it possible for the onboard terminal 11 and the mobile terminal 12 to transmit the onboard log and the mobile log to the data center 14 without significantly affecting the daily use of the mobile terminal 12 by the user.

The examples described hereinabove are exemplifications for illustrating the present invention, and do not purport to limit the scope of the present invention solely to the examples. A person skilled in the art will be able to put the present invention into practice in a variety of other modes without departing from the gist of the present invention.

What is claimed is:

1. A computer system, comprising:
a first apparatus and a second apparatus connected via a first data communications channel,
wherein the first apparatus is installed in a vehicle and includes a storage medium interface, a controller, and a first storage part,
wherein the controller: stores a first data, which is information relating to the operation of the first apparatus in the first storage part;
sends an inquiry to the second apparatus via the first data communications channel about whether the first data can be transmitted;
receives one of approved or not approved from the second apparatus about whether the first data can be transmitted;
in a case where the transmission has been approved by the second apparatus, transmits the first data to the second apparatus via the first data communications channel; and
in a case where the transmission has not been approved by the second apparatus, receives a second data from the second apparatus via the first data communications channel, and outputs the first data and the second data to a storage medium,
wherein the second apparatus is a portable communication device including a carrier network interface and a wireless land area network interface, at least one of which is connected to a second data communication channel that is connected to a server, and a controller, the controller:
stores the second data, which is information relating to the operation of the second apparatus, in a second storage part;
upon receiving an inquiry from the first apparatus via the first data communications channel about whether the first data can be transmitted,
determines whether the first data can be transmitted from the first apparatus based on one or more conditions, wherein a condition, of the one or more conditions, is whether a volume of communication, of the second data communication channel, that includes the first data and the second data during a first time period that includes a current time exceeds a threshold;
in the determination, upon having determined to approve the transmission of the first data from the first apparatus, receives the first data from the first apparatus via the first data communications channel, and transmits the first data and the second data to the server via the second data communications channel; and
in the determination, upon having determined to not approve the transmission of the first data from the first apparatus, transmits the second data to the first apparatus via the first data communications channel,
wherein, in the case where the transmission has not been approved, a computer transmits the first data and the second data from the storage medium to the server,
wherein the threshold is based on an upper limit of the volume of communications of the second data communications channel during the first time period,
wherein the volume of communication is a value calculated based on the volume of communications, that includes the first data and the second data, from the start of the first time period until the current time point, and
wherein the second apparatus, in a case where the volume of communication is greater than the threshold, determines, in the determination, not to approve the transmission of the first data from the first apparatus.

2. A computer system according to claim 1, wherein the threshold is a value that is variably adjusted lower based on a remaining time period from the current time point to the end of the first time period.

3. A computer system according to claim 1, wherein the first time period fluctuates, with the current time point being defined as the end of the period.

4. A computer system according to claim 3, wherein the threshold is a value configured based on an average volume of communications for the second apparatus relative to the second data communications channel during a prescribed time period that is shorter than the first time period.

5. A computer system according to claim 1, wherein the second data communications channel is managed by a telecommunications carrier, the second apparatus is a communications apparatus used under a contract with the telecommunications carrier, the one or more conditions includes a condition pertaining to the second data communications channel that is imposed on the communication apparatus on the basis of the contract with the telecommunications carrier, the first data comprises information for analyzing a malfunction pertaining to the first apparatus, and the second data comprises information for analyzing a malfunction in the operation of the communication apparatus.

6. A data output method in a computer system in which a first apparatus and a second apparatus are connected via a first data communications channel, the first apparatus is installed in a vehicle and includes a storage medium interface, a controller, and a first storage part, and the second apparatus is a portable communication device including a carrier network interface and a wireless land area network interface, at least one of which is connected to a second data communication channel that is connected to a server, and a controller, the data output method comprising:
in the first apparatus:
storing a first data, which is information relating to the operation of the first apparatus,
sending an inquiry to the second apparatus via the first data communications channel about whether a first data stored in a first storage part can be transmitted;
receiving one of approved or not approved from the second apparatus about whether the first data can be transmitted;
in a case where transmission has been approved by the second apparatus, to transmit the first data to the second apparatus via the first data communications channel, and
in a case where transmission has not been approved by the second apparatus, to receive a second data from the second apparatus via the first data communications channel, and output the first data and the second data to a storage medium; and
in the second apparatus:
storing the second data, which is information relating to the operation of the second apparatus,
upon receiving an inquiry from the first apparatus via the first data communications channel about whether the first data can be transmitted,
determining whether the first data can be transmitted from the first apparatus based on one or more conditions, wherein a condition is whether a volume of communication, of a second data communications channel used by the second apparatus, that includes the first data and the second data during a first period of time that includes a current time exceeds a threshold;
in the determination, upon having determined to approve the transmission of the first data from the first apparatus, to receive the first data from the first apparatus via the first data communications channel, and transmit the first data and the second data to a server via the second data communications channel; and
in the determination, upon having determined not to approve the transmission of the first data from the first apparatus, to transmit the second data stored in a second storage part to the first apparatus via the first data communications channel, wherein, in the case where the transmission has not been approved, a computer transmits the first data and the second data from the storage medium to the server, wherein the threshold is based on an upper limit of the volume of communications of the second data communications channel during the first time period, wherein the volume of communication is a value calculated based on the volume of communications, that includes the first data and the second data, from the start of the first time period until the current time point, and wherein the second apparatus, in a case where the volume of communication is greater than the threshold, determines, in the determination, not to approve the transmission of the first data from the first apparatus.

7. A computer system, comprising:
a first computer and a second computer connected via a first data communications channel,
wherein the first computer is installed in a vehicle and is coupled to a storage medium interface, a controller, and a first storage part,
wherein the controller: stores a first data, which is information relating to the operation of the first computer in a first storage part,
sends an inquiry to the second computer via the first data communications channel about whether a first data stored in a first storage part can be transmitted;
receives one of approved or not approved from the second computer about whether the first data can be transmitted;
in a case where transmission has been approved by the second computer, transmitting the first data to the second computer via the first data communications channel; and
in a case where transmission has not been approved by the second computer, receiving a second data from the second computer via the first data communications channel, and outputting the first data and the second data to a storage medium, and
wherein the second computer is included in a portable communication device including a carrier network interface and a wireless land area network interface, at least one of which is connected to a second data communication channel that is connected to a server, and a controller, the controller:
stores the second data, which is information relating to the operation of the second computer, in a second storage part,
upon receiving an inquiry from the first computer via the first data communications channel about whether the first data can be transmitted,
determining that the first data can be transmitted from the first computer based on one or more conditions, wherein a condition is whether a volume of communication, of the second data communications channel, that includes the first data and the second data during a first time period that includes a current time exceeds a threshold,
in the determination, when determination has been made to approve the transmission of the first data from the first computer, receiving the first data from the first computer via the first data communications channel, and transmitting the first data and the second data to the server via the second data communications channel; and in the determination, when determination has been made not to approve the transmission of the first data from the first computer, transmitting the second data stored in a second storage part to the first computer via the first data communications channel, and wherein, in the case where the transmission has not been approved, a third computer transmits the first data and the second data from the storage medium to the server, wherein the threshold is based on an upper limit of the volume of communications of the second data communications channel during the first time period, wherein the volume of communication is a value calculated based on the volume of communications, that includes the first data and the second data, from the start of the first time period until the current time point, and wherein the second apparatus, in a case where the volume of communication is greater than the threshold, determines, in the determination, not to approve the transmission of the first data from the first apparatus.

8. A computer system according to claim 1, wherein the second data communications channel is managed by a telecommunications carrier, the second apparatus is a communications apparatus used under a contract with the telecommunications carrier, the one or more conditions includes a condition pertaining to the second data communications channel that is imposed on the communication apparatus on the basis of the contract with the telecommunications carrier, the first data comprises information for analyzing a malfunction pertaining to the first apparatus, and the second data comprises information for analyzing a malfunction in the operation of the communication apparatus.

9. A computer system according to claim 2, wherein the second data communications channel is managed by a telecommunications carrier, the second apparatus is a communications apparatus used under a contract with the telecommunications carrier, the one or more conditions includes a condition pertaining to the second data communications channel is imposed on the communication apparatus on the basis of the contract with the telecommunications carrier, the first data comprises information for analyzing a malfunction pertaining to the first apparatus, and the second data comprises information for analyzing a malfunction in the operation of the communication apparatus.

10. A computer system according to claim 3, wherein the second data communications channel is managed by a telecommunications carrier, the second apparatus is a communications apparatus used under a contract with the telecommunications carrier, the one or more conditions includes a condition pertaining to the second data communications channel is imposed on the communication apparatus on the basis of the contract with the telecommunications carrier, the first data comprises information for analyzing a malfunction pertaining to the first apparatus, and the second data comprises information for analyzing a malfunction in the operation of the communication apparatus.

11. A computer system according to claim 4, wherein the second data communications channel is managed by a telecommunications carrier, the second apparatus is a communications apparatus used under a contract with the telecommunications carrier, the one or more conditions includes a condition pertaining to the second data communications channel is imposed on the communication apparatus on the basis of the contract with the telecommunications carrier, the first data comprises information for analyzing a malfunction pertaining to the first apparatus, and the second data comprises information for analyzing a malfunction in the operation of the communication apparatus.

12. A computer system according to claim 1, wherein the second apparatus receives information indicating a capacity of the first data, wherein the second apparatus further includes a buffer storage area, wherein the second data is stored in the buffer storage area, wherein the first data can be transmitted from the first apparatus based on determining at least one of the following conditions of the one or more conditions:

whether the capacity of the first data exceeds a free capacity of the buffer storage area, whether the land area network interface is connected to a land area network, and whether the carrier network interface is connected to the carrier network.

13. The computer system according to claim 12, wherein the first data can be transmitted from the first apparatus based on determining, first, whether the capacity of the first data exceeds a free capacity of the buffer storage area, and if yes, the transmission is not approved, and if not, determine whether the land area network interface is connected to a land area network, if yes, the transmission is approved and if not, determine whether the carrier network interface is connected to the carrier network, if yes, the transmission is approved.

* * * * *